United States Patent
Wu

(10) Patent No.: US 8,453,807 B2
(45) Date of Patent: Jun. 4, 2013

(54) HYDRAULIC DAMPER DEVICE FOR RETARDING MOVEMENT OF A MOVABLE MEMBER TOWARD A STATIONARY MEMBER

(76) Inventor: Chung-Hsing Wu, Shanhua Township, Tainan County (TW)

( * ) Notice: Subject to any disclaimer, the term of this patent is extended or adjusted under 35 U.S.C. 154(b) by 311 days.

(21) Appl. No.: 12/779,892

(22) Filed: May 13, 2010

(65) Prior Publication Data

US 2011/0278117 A1    Nov. 17, 2011

(30) Foreign Application Priority Data

Jul. 23, 2009  (TW) ................................ 98124862 A

(51) Int. Cl.
*F16F 9/06* (2006.01)

(52) U.S. Cl.
USPC ..................................... 188/269; 188/322.18

(58) Field of Classification Search
USPC .......... 188/269, 314, 322.17, 322.18, 322.19;
267/64.11, 64.15, 118, 120, 124, 256; 16/49,
16/51, 56, 66
See application file for complete search history.

(56) References Cited

U.S. PATENT DOCUMENTS

| | | | | |
|---|---|---|---|---|
| 1,397,377 A * | 11/1921 | Harpham | ...................... | 267/221 |
| 2,679,827 A * | 6/1954 | Perdue | ................. | 92/8 |
| 2,867,298 A * | 1/1959 | Roder | ......................... | 188/282.5 |
| 3,865,356 A * | 2/1975 | Wossner | ........................ | 267/139 |
| 4,102,006 A * | 7/1978 | Jenkins | ............................. | 16/51 |
| 4,720,085 A * | 1/1988 | Shinbori et al. | ........... | 267/64.16 |
| 5,988,608 A * | 11/1999 | Koch | ............................. | 267/120 |

FOREIGN PATENT DOCUMENTS

JP        60078128 A  *  5/1985
JP        61211547 A  *  9/1986

* cited by examiner

*Primary Examiner* — Robert A Siconolfi
*Assistant Examiner* — Stephen Bowes
(74) *Attorney, Agent, or Firm* — Knobbe, Martens, Olson & Bear LLP

(57) ABSTRACT

A hydraulic damper device for retarding movement of a movable member toward a stationary member, includes a cylinder, an axially shiftable plug disposed in the cylinder to partition a receiving chamber into liquid and air compartments, a piston axially movable in the liquid compartment to divide the same into plug-side and end-side sub-compartments and having a passage, a piston rod secured to the piston and extending along the axis through the axially shiftable plug to permit axial movement of the piston. When the piston proceeds with a final stage of retarding movement, the axially shiftable plug is urged to move by virtue of an increased pressure in the plug-side sub-compartment for generating an increased counteracting force in the air compartment against the increased pressure, thereby further slowing down the retarding movement of the piston.

7 Claims, 9 Drawing Sheets

HYDRAULIC DAMPER DEVICE FOR RETARDING MOVEMENT OF A MOVABLE MEMBER TOWARD A STATIONARY MEMBER

BACKGROUND OF THE INVENTION

1. Field of the Invention

This invention relates to a hydraulic damper device, more particularly to a hydraulic damper device for retarding movement of a movable member, such as a door or a drawer toward a stationary member, such as a framework or a furniture article.

2. Description of the Related Art

A conventional hydraulic damper device, which is provided for connecting a movable member, such as a door or a drawer, to a stationary member, such as a framework, generally includes a cylinder with a liquid-receiving chamber, and a piston movably disposed in the liquid-receiving chamber. When the movable member is moved toward the stationary member, the piston is moved to urge flowing of the liquid in the liquid-receiving chamber to generate an increased liquid pressure, thereby retarding the movement of the piston to reduce an impact to the stationary member. In such a damper device, a damping force generated as a result of the flowing of the liquid is not regulated so that excess liquid pressure is generated in the final stage of the retarding movement of the piston, which may result in liquid leakage of the cylinder while exerting an impact on an end wall of the cylinder, thereby making noise.

SUMMARY OF THE INVENTION

One object of the present invention is to provide a hydraulic damper device which can regulate interior pressure of a cylinder so as to prevent leakage of liquid and to smoothly move a piston.

Another object of the present invention is to provide a hydraulic damper device which can generate an increased counterforce against the piston so as to further slow down the retarding movement in its final stage.

According to this invention, the hydraulic damper device includes a cylinder having an inner cylindrical surface which defines a receiving chamber therein. The receiving chamber extends along an axis to terminate at first and second end walls. An axially shiftable plug is disposed in the receiving chamber and is in slidable frictional engagement with the inner cylindrical surface to partition the receiving chamber into liquid and air compartments. A piston is disposed to be axially movable in the liquid compartment and has an outer peripheral surface which confronts the inner cylindrical surface radially to divide the liquid compartment into plug-side and end-side sub-compartments. The piston has a primary passage fluidly communicated with the plug-side and end-side sub-compartments. A piston rod has a connected end secured to the piston, and a shank extending from the connected end along the axis through the axially shiftable plug and the first end wall so as to permit the piston to proceed with a course of retarding movement. When the piston proceeds with the final stage of the retarding movement, the axially shiftable plug is urged to move towards the first end wall by virtue of an increased pressure in the plug-side sub-compartment resulting from an surge in a plug-side bound liquid flow from the end-side sub-compartment into the plug-side sub-compartment.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
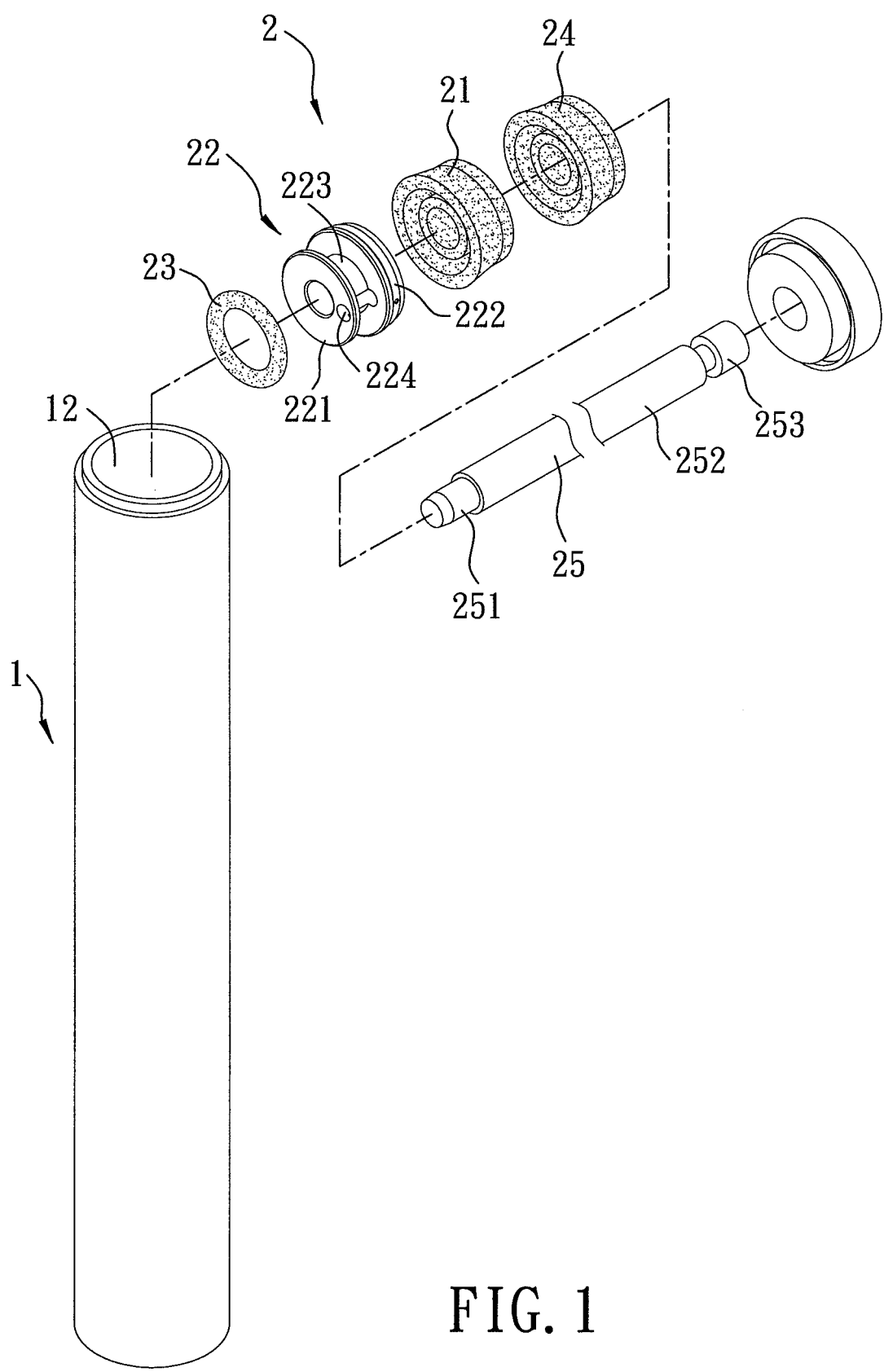
FIG. 1 is an exploded perspective view of the first preferred embodiment of a hydraulic damper device according to this invention.

Before the present invention is described in greater detail, it should be noted that same reference numerals have been used to denote like elements throughout the specification.

Figure 2:
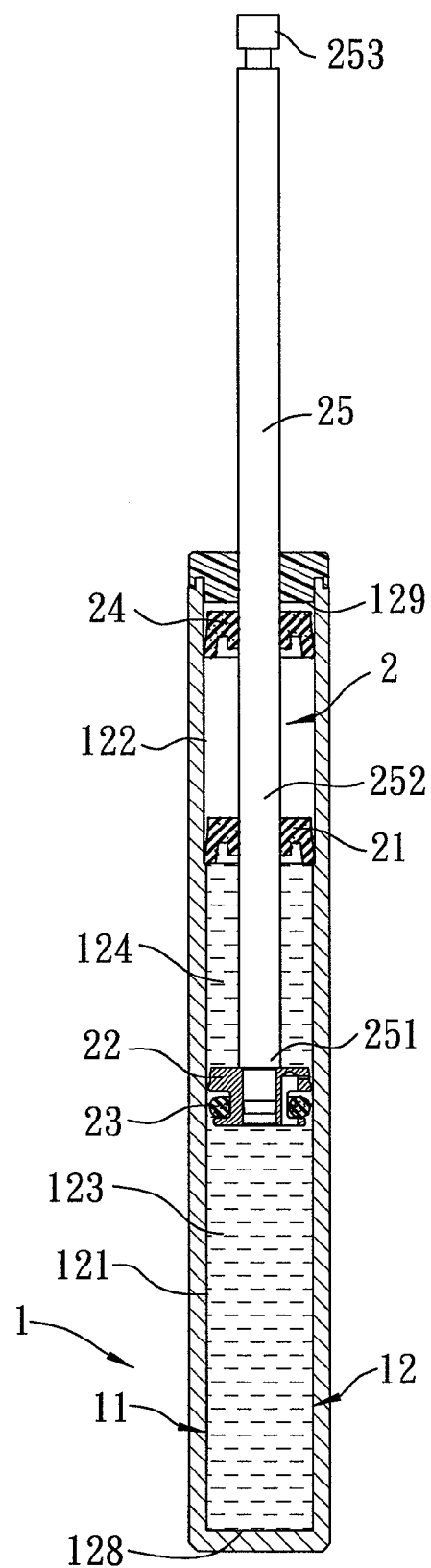
FIG. 2 is a sectional view of the first preferred embodiment when a piston is in a pressure-relieving position.
Figure 3:
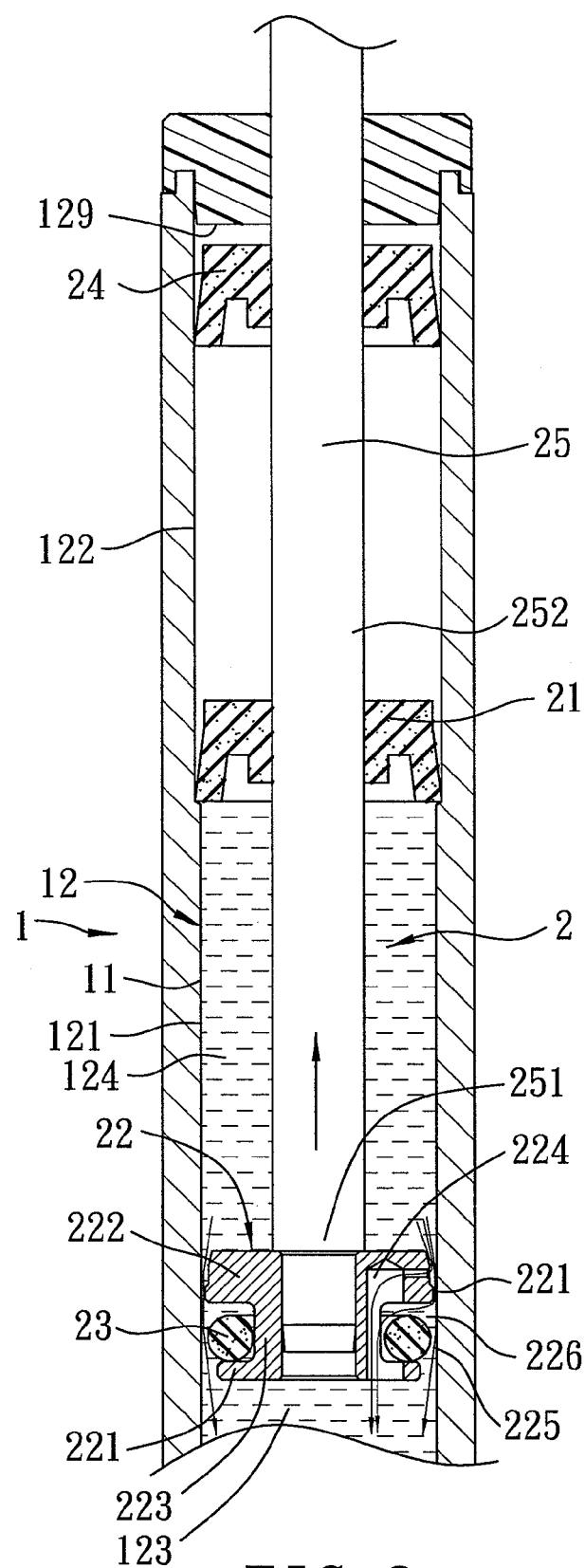
FIG. 3 is a fragmentary sectional view of the first preferred embodiment when the piston is moved toward a closest position.

Referring to FIGS. 1 to 3, the first preferred embodiment of a hydraulic damper device according to the present invention is shown to comprise a cylinder 1, an axially shiftable plug 21, a piston 22, a piston rod 25, and a biasing unit.

The cylinder 1 is adapted to be connected to one of movable and stationary members (not shown), and has an inner cylindrical surface 11 which surrounds an axis and which defines a receiving chamber 12 therein. The receiving chamber 12 extends along the axis to terminate at first and second end walls 129,128.

The axially shiftable plug 21 is disposed in the receiving chamber 12 and is in slidable frictional engagement with the inner cylindrical surface 11 to partition the receiving chamber 12 into liquid and air compartments 121,122 which are filled with liquid and air, respectively.

The piston 22 is disposed to be axially movable in the liquid compartment 121, and has an outer peripheral surface 221 which surrounds the axis, and which is configured to confront the inner cylindrical surface 11 radially to divide the liquid compartment 121 into plug-side and end-side sub-compartments 124,123. The piston 22 includes a larger-diameter annular portion 222 and a smaller-diameter annular portion 221 disposed proximate to the plug-side and end-side sub-compartments 124,123, respectively, a neck portion 223 interconnecting the larger-diameter and smaller-diameter annular portions 222,221, and a ring-shaped check valve 23 movably sleeved on the neck portion 223. The piston 22 has a primary passage 224 which is fluidly communicated with the plug-side and end-side sub-compartments 124,123, and an auxiliary passage 225 which is disposed in the outer peripheral surface 221 to be communicated with the plug-side and end-side sub-compartments 124,123 and which radially confronts the inner cylindrical surface 11 to define a valve seat 226. Thus, when the piston 22 is moved in a course of opening movement, i.e., in a direction as indicated by the arrow shown in FIG. 3 to a closest position relative to the first end wall 129, an end-side bound liquid flow is generated through both the primary and auxiliary passages 224,225 to facilitate the movement of the piston 22. When the piston 22 is moved in a course of retarding movement, i.e., in a direction as indicated by the arrow shown in FIG. 6 to a most remote position relative to the first end wall 129, a plug-side bound liquid flow generated as a result thereof is only admitted through the primary passage 224 since the auxiliary passage 225 is shut off by a drifting movement of the check valve 23 to a closed position to engage the valve seat 226 by the plug-side bound liquid flow.

The piston rod 25 has a connected end 251 secured to the piston 22, and a shank 252 extending from the connected end 251 along the axis through the axially shiftable plug 21 and the first end wall 129 to terminate at a pulled end 253 which is disposed outwardly of the first end wall 129 and which is adapted to be connected to the other one of the movable and stationary members (not shown).

The biasing unit is disposed between the axially shiftable plug 21 and the first end wall 129 to exert a biasing force on the axially shiftable plug 21 to counteract an increased pressure in the plug-side sub-compartment 124. Specifically, the biasing unit includes a proximate plug 24 which is disposed in the air compartment 122, which is spaced apart axially from the axially shiftable plug 21 to define a compressible volume sub-chamber, and which is in slidable engagement with the inner cylindrical surface 11. The shank 252 of the piston rod 25 extends through and is in slidable engagement with the axially shiftable plug 21, the proximate plug 24, and the first end wall 129 so as to facilitate axial movement of the piston 22.

Figure 4:
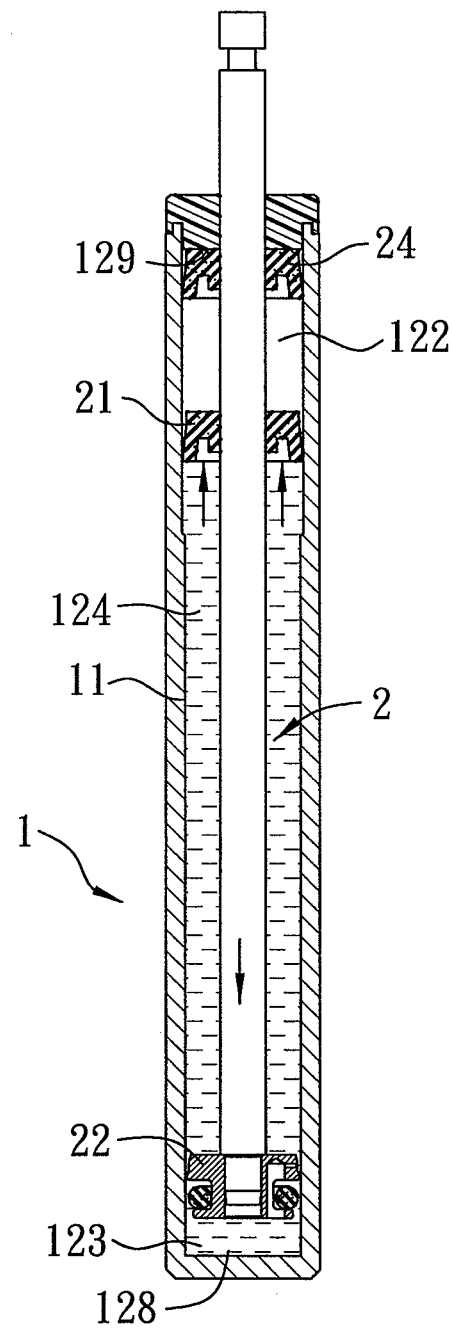
FIG. 4 is a sectional view of the first preferred embodiment when the piston is moved to a most remote position.
Figure 5:
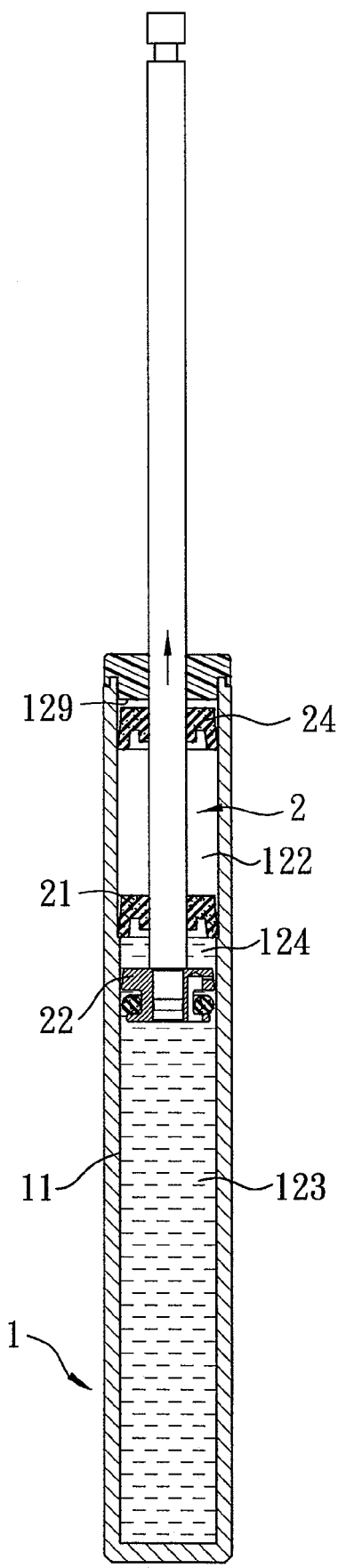
FIG. 5 is a sectional view of the first preferred embodiment when the piston is moved to the closest position.

When the movable member is moved away from the stationary member, i.e., in the course of opening movement, the piston 22 is moved from the most remote position (see FIG. 4) to the closest position (FIG. 5). At this stage, as shown in FIG. 3, the end-side bound liquid flow is generated through both the primary and auxiliary passages 224,225 to facilitate the movement of the piston 22, thereby easing. movement of the movable member away from the stationary member since the check valve 23 is drifted to an opening position, where the check valve 23 abuts against the smaller-diameter annular portion 221 to disengage from the valve seat 226. Besides, the liquid pressure in the plug-side sub-compartment 124 applied to the axially shiftable plug 21 is gradually decreased so that the axially shiftable plug 21 is moved toward the second end wall 128, and the proximate plug 24 is slightly moved away from the first end wall 129.

Figure 6:
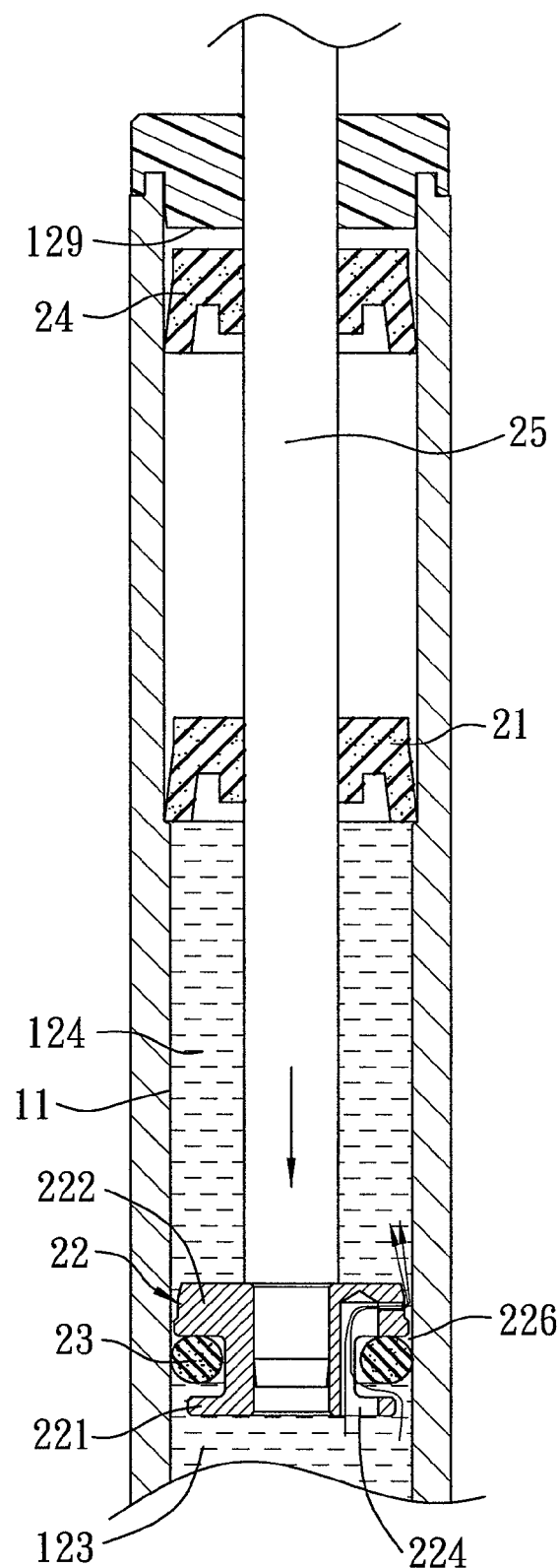
FIG. 6 is a fragmentary sectional view of the first preferred embodiment when the piston is moved toward the most remote position.

When the movable member is moved toward the stationary member, i.e., in a course of retarding movement, the piston 22 is moved from the closest position (FIG. 5), where the piston is subject to a largest liquid pressure in the end-side sub-compartment 123, to the most remote position (see FIG. 4), where the piston is subject to a smallest liquid pressure in the end-side sub-compartment 123, via a pressure-relieving position (as shown in FIG. 2). At this stage, as shown in FIG. 6, the plug-side bound liquid flow generated as a result thereof is only admitted through the primary passages 224 since the check valve 23 is moved to the closed position, where the check valve 23 abuts against the larger-diameter annular portion 222 to engage the valve seat 226, thereby further decelerating the retarding movement of the movable member toward the stationary member. As the liquid pressure in the plug-side sub-compartment 124 is incrementally increased, which results from an surge in the plug-side bound liquid flow from the end-side sub-compartment 123 into the plug-side sub-compartment 124, when the piston 22 proceeds with the final stage of the retarding movement, as shown in FIGS. 2 and 4, the axially shiftable plug 21 is urged to move incrementally towards the first end wall 129 by virtue of the increased pressure in the plug-side sub-compartment 124. Moreover, the compressible volume sub-chamber is incrementally compressed so as to vest the axially shiftable plug 21 with an incrementally increased biasing force to counteract the increased pressure in the plug-side sub-compartment 124 while the proximate plug 24 is urged to move to abut against the first end wall 129, thereby further slowing down the retarding movement of the movable member toward the stationary member.

Figure 7:
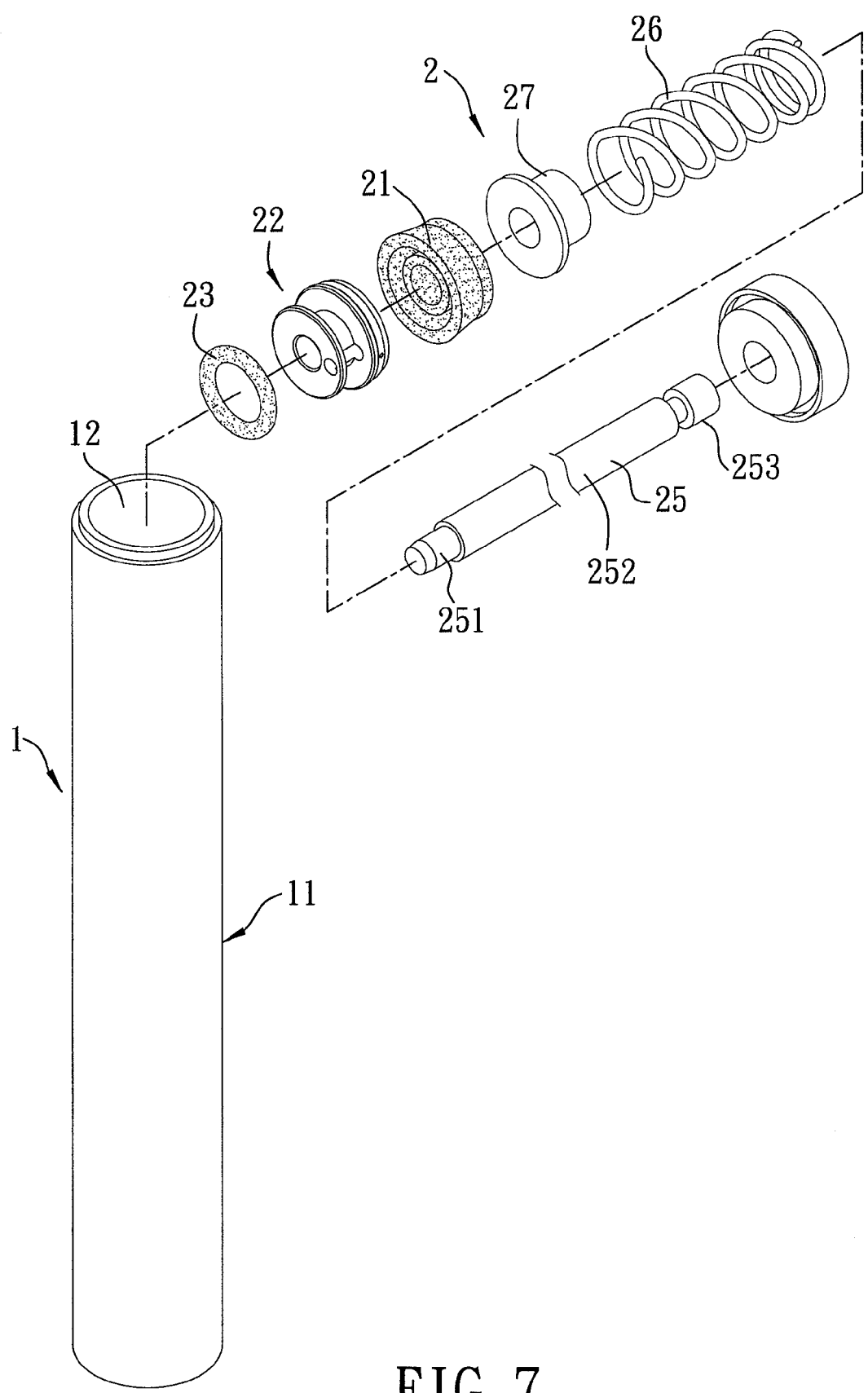
FIG. 7 is an exploded perspective view of the second preferred embodiment of a hydraulic damper device according to this invention.
Figure 8:
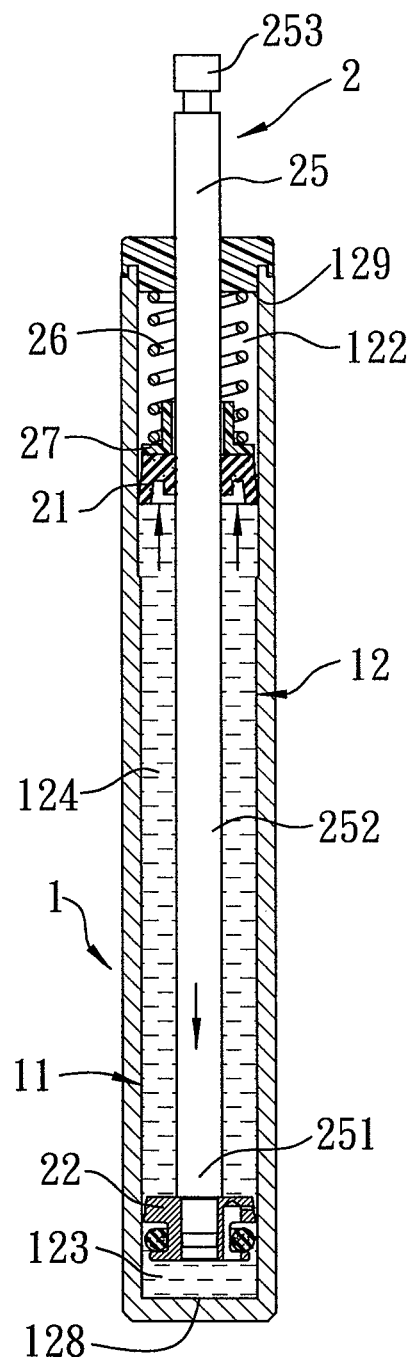
FIG. 8 is a sectional view of the second preferred embodiment when a piston is moved to a most remote position.
Figure 9:
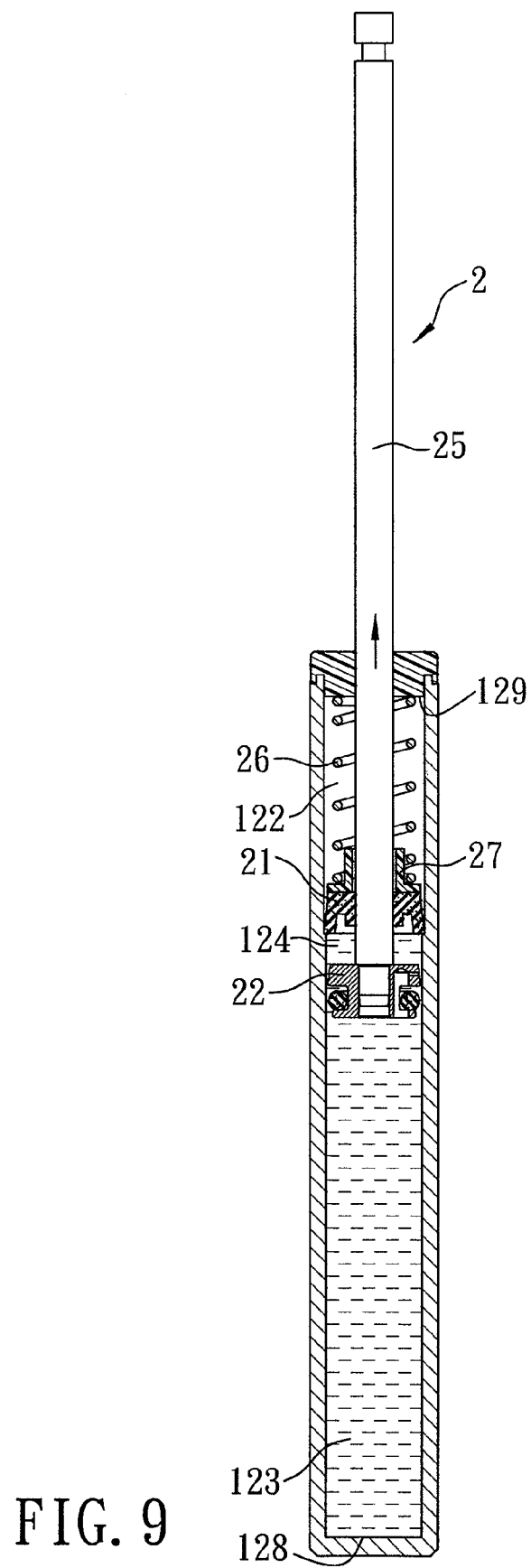
FIG. 9 is a sectional view of the second preferred embodiment when the piston is moved to a closest position.

Referring to FIGS. 7 and 8, the second preferred embodiment of a hydraulic damper device according to this invention is shown to be similar to the previous embodiment in construction, except that the biasing unit includes a coil spring 26 which is disposed in the air compartment 122 to abut against the first end wall 129 and a spring seat 27 that is mounted on the axially shiftable plug 21. Thus, the biasing force of the coil spring 26 is incrementally increased when the axially shiftable plug 21 is moved towards the first end wall 129, thereby incrementally adding an increased retarding force to the piston 22 in the final stage of the retarding movement.

As illustrated, by configuration of the primary and auxiliary passages 224,225, the plug-side and end-side bound liquid flows can be regulated so that the opening movement of the movable member relative to the stationary member is proceeded with a higher speed, and the closing movement of the movable member is proceeded with a lower speed. By means of the slidable engagement between the piston rod 25 and each of the axially shiftable plug 21 and the proximate plug 24, the axial movement of the piston 22 is ensured. By means of the biasing unit which defines a compressible volume sub-chamber, the liquid and air pressures in the receiving chamber 12 can be regulated to avoid occurrence of excess liquid pressure generated in the receiving chamber 12 and to result in a smooth movement of the movable member.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A hydraulic damper device for retarding movement of a movable member toward a stationary member, comprising:
a cylinder adapted to be connected to one of the movable and stationary members, and having an inner cylindrical surface which surrounds an axis and which defines a receiving chamber therein, said receiving chamber extending along the axis to terminate at first and second end walls;
an axially shiftable plug disposed in said receiving chamber and in slidable frictional engagement with said inner cylindrical surface to partition said receiving chamber into a liquid compartment filled entirely with liquid and an air compartment filled entirely with air;
a piston disposed to be axially movable in said liquid compartment and having an outer peripheral surface which surrounds the axis, and which is configured to confront said inner cylindrical surface radially to divide said liquid compartment into plug-side and end-side sub-compartments, said piston having a primary passage which is fluidly communicated with said plug-side and end-side sub-compartments such that, as a result of an end-side bound liquid flow through said primary passage in a course of opening movement, said piston is moved from a most remote position to a closest position relative to said first end wall, and such that, in a course of retarding movement, said piston is moved from the closest position, where said piston is subject to a largest liquid pressure in said end-side sub-compartment, to the most remote position, said piston is subject to a smallest liquid pressure in said end-side sub-compartment; and a piston rod which has a connected end secured to said piston, and a shank extending from said connected end along the axis through said axially shiftable plug and said first end wall so as to permit said piston to proceed with the course of retarding movement such that, when said piston proceeds with the final stage of the retarding movement, said axially shiftable plug is urged to move towards said first end wall by virtue of an increased pressure in said plug-side sub-compartment resulting from an surge in a plug-side bound liquid flow from said end-side sub-compartment into said plug-side sub-compartment, wherein said shank of said piston rod is in slidable engagement with said axially shiftable plug and said first end wall and terminates at a pulled end which is disposed outwardly of said first end wall to be adapted to be connected to the other one of the movable and stationary member.

2. The hydraulic damper device according to claim 1, further comprising a biasing unit disposed between said axially shiftable plug and said first end wall to exert a biasing force on said axially shiftable plug to counteract the increased pressure.

3. The hydraulic damper device according to claim 2, wherein said biasing unit has a compressible volume sub-chamber which is disposed in said air compartment, and which is compressed by the increased pressure in said plug-side sub-compartment in the final stage of the retarding movement.

4. The hydraulic damper device according to claim 3, wherein said biasing unit includes a proximate plug which is disposed in said air compartment, and which is spaced apart axially from said axially shiftable plug to define said compressible volume sub-chamber, said proximate plug being disposed to be in slidable engagement with said inner cylindrical surface such that, as a result of being pressed by virtue of movement of said axially shiftable plug toward said first end wall, said axially shiftable plug moves incrementally toward said proximate plug to incrementally compress said compressible volume sub-chamber so as to vest said axially shiftable plug with an incrementally increased biasing force to counteract the increased pressure.

5. The hydraulic damper device according to claim 4, wherein said shank of said piston rod extends through and is in slidable engagement with said proximate plug.

6. The hydraulic damper device according to claim 2, wherein said biasing unit includes a coil spring which is disposed in said air compartment and which is configured such that the biasing force is incrementally increased when said axially shiftable plug is moved towards said first end wall, thereby incrementally adding an increased retarding force to said piston in the final stage of the retarding movement.

7. The hydraulic damper device according to claim 1, wherein said piston has an auxiliary passage which is disposed in said outer peripheral surface to be communicated with said plug-side and end-side sub-compartments and which radially confronts said inner cylindrical surface to define a valve seat, and a check valve which is disposed to be driftable between an opening position, where said check valve is disengaged from said valve seat as a result of the end-side bound liquid flow, and a closed position, where said check valve is urged to be engaged with said valve seat by the plug-side bound liquid flow to interrupt the fluid communication through said auxiliary passage.

\* \* \* \* \*